(12) United States Patent
Vismara

(10) Patent No.: US 12,377,752 B2
(45) Date of Patent: Aug. 5, 2025

(54) SYSTEM FOR CONTROL AND MANAGEMENT OF THE CHARGING OF ELECTRIC VEHICLES

(71) Applicant: Mario Andrea Vismara, Casatenovo (IT)

(72) Inventor: Mario Andrea Vismara, Casatenovo (IT)

(73) Assignee: Mario Andrea Vismara, Casatenova (IT)

( * ) Notice: Subject to any disclaimer, the term of this patent is extended or adjusted under 35 U.S.C. 154(b) by 453 days.

(21) Appl. No.: 17/413,796

(22) PCT Filed: Nov. 21, 2019

(86) PCT No.: PCT/EP2019/082028
§ 371 (c)(1),
(2) Date: Jun. 14, 2021

(87) PCT Pub. No.: WO2020/120093
PCT Pub. Date: Jun. 18, 2020

(65) Prior Publication Data
US 2022/0016995 A1    Jan. 20, 2022

(30) Foreign Application Priority Data
Dec. 14, 2018   (IT) .................. 102018000011089

(51) Int. Cl.
*B60L 53/68*    (2019.01)
*B60L 53/66*    (2019.01)
(Continued)

(52) U.S. Cl.
CPC ............. *B60L 53/68* (2019.02); *B60L 53/665* (2019.02); *G06Q 10/02* (2013.01); *G06Q 50/06* (2013.01);
(Continued)

(58) Field of Classification Search
None
See application file for complete search history.

(56) References Cited

U.S. PATENT DOCUMENTS 9,815,382 B2   11/2017  Penilla et al.
2008/0039980 A1*  2/2008  Pollack ................... B60L 53/68
                                                    700/295
(Continued)

FOREIGN PATENT DOCUMENTS

EP    2617599 A2    7/2013
EP    3 343 726 A1  7/2018
(Continued)

OTHER PUBLICATIONS

European Examination Report dated Dec. 9, 2022 received in European Application No. 19 805 312.6.
(Continued)

*Primary Examiner* — David V Henze-Gongola
(74) *Attorney, Agent, or Firm* — Scully, Scott, Murphy & Presser, P.C.

(57) ABSTRACT

A system for control and management of the charging of electric vehicles, comprising: at least one main server, at least one telecommunications network, at least one first supervision and control unit for charging facilities of at least one operator of charging facilities for electric vehicles and at least one computer.

9 Claims, 1 Drawing Sheet

(51) Int. Cl.
    *G06Q 10/02* (2012.01)
    *G06Q 50/06* (2024.01)
(52) U.S. Cl.
    CPC ....... *B60L 2240/72* (2013.01); *B60L 2250/16* (2013.01)

(56) References Cited

U.S. PATENT DOCUMENTS

| | | | |
|---|---|---|---|
| 2012/0136574 A1* | 5/2012 | Kobayashi | B60W 20/00 701/533 |
| 2013/0093393 A1* | 4/2013 | Shimotani | G01C 21/3469 320/109 |
| 2013/0179057 A1* | 7/2013 | Fisher | B60L 53/66 701/1 |
| 2015/0298565 A1* | 10/2015 | Iwamura | G06Q 10/04 701/22 |
| 2015/0306969 A1* | 10/2015 | Sabripour | H02J 3/322 320/109 |
| 2015/0367740 A1* | 12/2015 | McGrath | B60L 53/64 320/137 |
| 2017/0282736 A1 | 10/2017 | Goei | |

FOREIGN PATENT DOCUMENTS

| | | |
|---|---|---|
| JP | 2008-65635 A | 3/2008 |
| JP | 2010-246291 A | 10/2010 |
| JP | 2013-171524 A | 9/2013 |
| WO | 2011/115182 A1 | 9/2011 |
| WO | 2013/053413 A1 | 4/2013 |
| WO | 2013/057587 A2 | 4/2013 |
| WO | 2018/204818 A1 | 11/2018 |

OTHER PUBLICATIONS

International Search Report and Written Opinion dated Jan. 23, 2020 issued in PCT/EP2019/082028.
Italian Search Report and Written Opinion dated Aug. 5, 2019 issued in IT 201800011089, with partial translation.
Japanese Notice of Reasons for Refusal dated Oct. 24, 2023 received in Japanese Patent Application No. 2021-534250, together with an English-language translation.

* cited by examiner

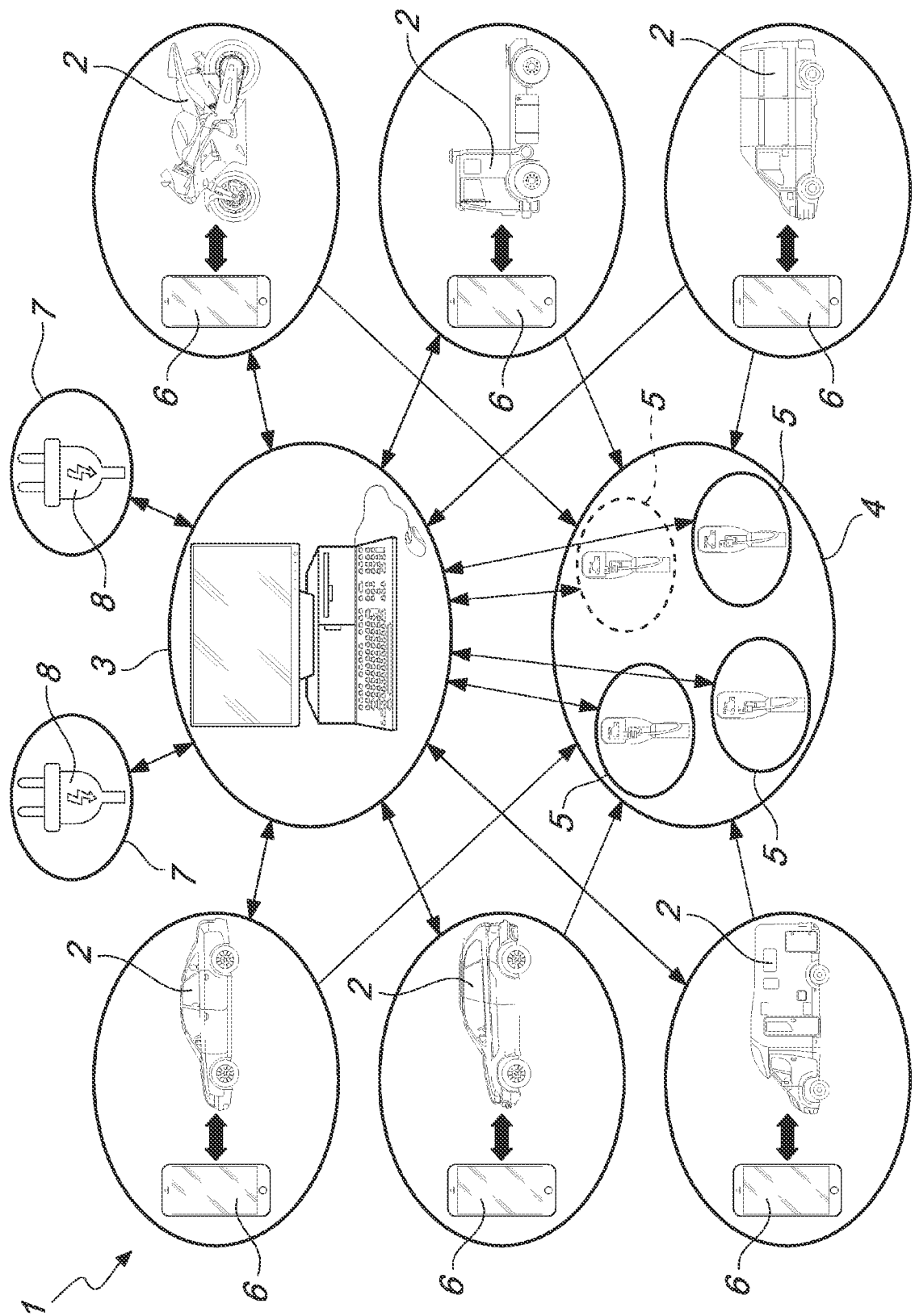

SYSTEM FOR CONTROL AND MANAGEMENT OF THE CHARGING OF ELECTRIC VEHICLES

The present invention relates to a system for control and management of the charging of electric vehicles which is adapted to facilitate electric mobility. The system according to the invention also has an impact in terms of balancing the electrical grid as a function of the energy consumption of electric vehicles.

The transport sector, private and public, is undergoing a major change in that internal combustion engines are slowly giving ground to electric motors.

These changes can now be felt directly in the automotive sector (in fact many completely electric vehicles are already on the roads), although they are destined to also involve other areas of road transport (articulated vehicles and semi-trailer trucks for transporting goods, buses, vans and motorcycles).

The most evident problems of electric vehicles are linked to the guaranteed capacity of batteries and the lengthy recharging times required: electric motors as yet cannot compete with the extremely long travel distances possible with internal combustion engines.

The energy stored in the battery pack is directly proportional to its size and mass and therefore an increase in the autonomy, i.e. of the maximum expected travel for the same technologies used, implies a corresponding increase in the encumbrances and in the weight of the necessary battery pack.

In order to retain an appropriate load capacity for the vehicle and in order to keep the corresponding weight under a limit that does not compromise its performance and behavior on the road, it becomes necessary to give up to a long autonomy, adopting smaller batteries.

Accordingly, conventional electric vehicles do not allow the driver to make long trips in a single stage, since they necessitate stops in order to recharge the batteries.

A further problem is constituted by the fact that the network for recharging electric vehicles today is very underdeveloped, especially outside of urban centers.

With a map of the charging facilities available, it is possible to plan the trip to be made with an electric car, defining specific stops for recharging.

Unfortunately however, it is not possible to estimate the actual amount of time necessary for the recharging operations, because one is never certain of arriving at the charging station and finding it free (in particular when one considers that often the driver has a limited range allowed by the residual charge of the batteries).

It must be considered in fact that the average time taken to recharge an electric vehicle is at least 10 times that required for traditional refueling, we can therefore comprehend the wait times that a motorist of an electric vehicle is faced with today if he or she should find other vehicles at the charging point that are already being recharged or, worse, if there are still more vehicles waiting to recharge.

Some operators enable their customers (by using the operator's proprietary dedicated software applications) to book the recharging session at one of their stalls, for the purpose of guaranteeing immediate usability of the station at the time booked.

However, such booking usually has a limited time duration (of the order of 10-20 minutes), after which the booking expires, so preventing the motorist from making advance plans for transfers that involve traveling long distances and extended periods of driving.

In addition, if during the trip conditions should arise such that it is not possible to reach the charging point by the time limit imposed by the booking (e.g. because of heavy traffic, adverse weather conditions etc.), the motorist would not be certain of being able to recharge the automobile by a certain time, and may in fact find other users recharging or waiting to recharge.

Such method could furthermore lead to an extended engagement of the charging post by the user who, realizing that he or she is running late, might book it repeatedly when the previous booking expires, which leads to loss of earnings for the operator and inefficiency for other users, who would always find the charging post engaged.

The need for the motorist to factor in new stop-offs is therefore probable, and the current lack of charging points together with having to rely on the dedicated software of a single operator (a single provider) to carry out the recharging operations is therefore risky, in that the corresponding territorial cover may be locally insufficient.

Furthermore the system thus described does not allow the operator to forecast the future consumption of electric current (profiling), so preventing the scheduling of the purchases and the consequent savings that would derive therefrom.

Similar inefficiencies also arise when the electric car manufacturers act as operators (providers) of charging facilities, as their interest in fact lies in promoting their own facilities and vehicles exclusively, at the expense of greater convenience for the driver of the car, who otherwise would be guided to prefer other operators in predefined conditions and areas. Such promotion translates to a software application for navigation and control of the vehicle, which takes account solely of the charging facilities of the predefined operator (provider).

The aim of the present invention is to solve the above mentioned drawbacks, by providing a system for control and management of the charging of electric vehicles that enables an effective planning of the necessary recharging operations during a trip, in favor first and foremost of all drivers of electric vehicles and, as a result, of all the other parties involved in the world of electric mobility.

Within this aim, an object of the invention is to provide a system for control and management of charging facilities for electric vehicles that can draw on a plurality of separate operators (providers) of charging facilities.

Another object of the invention is to provide a system for control and management of the charging of electric vehicles that makes it possible to program in real time the scheduling of recharging operations for a vehicle, as a function of the corresponding consumption and of the routes to be covered.

Another object of the present invention is to provide a system for control and management of the charging of electric vehicles which is of low cost, easily and practically implemented and safely applied.

This aim and these and other objects which will become better apparent hereinafter are achieved by a system for control and management of the charging of electric vehicles of a type chosen from vehicles with exclusively electric motor drives and vehicles with hybrid motor drives, characterized in that it comprises:
- at least one main server,
- at least one telecommunications network,
- at least one first supervision and control unit for charging facilities of at least one operator of charging facilities for electric vehicles, at least one computer associated with a user account chosen from a user, a driver, a corresponding electric vehicle, the person jointly liable for the vehicle and any combination thereof, said server being adapted to be connected, via said telecommunications network, to said at least one first supervision and control unit of at least one operator of electric charging facilities for road vehicles and to said at least one computer associated with the corresponding user account, for the execution of operations comprising bookings, and/or corresponding cancellations, of at least one stall of at least one charging facility and for sharing the effects of such operations with a predefined number of computers which are associated with at least one respective user account.

Further characteristics and advantages of the invention will become better apparent from the detailed description that follows of a preferred, but not exclusive, embodiment of the system for control and management of the charging of electric vehicles according to the invention, which is illustrated by way of non-limiting example in the accompanying drawings, wherein:

FIG. 1 is a block diagram of the system for control and management of the charging of electric vehicles according to the invention.

With particular reference to this FIGURE, the reference numeral 1 generally designates a system for control and management of the charging of electric vehicles 2.

The term "electric vehicles" 2 as used here comprises all vehicles with exclusively electric motor drives and also all vehicles with hybrid motor drives (which can be driven, even if only for limited distances, by their electric motors).

The system 1 according to the invention comprises:

at least one main server 3, which can be physically located at a specific provider of the service for control and management or defined in a respective area of a remote and remotely-managed data processing center;

at least one telecommunications network (not specifically shown in the accompanying FIGURES) which can be constituted by an internet network, by a telephone network, by a radiofrequency network, by an electrical grid, by an optical network and/or by any combination of the aforesaid networks and other networks in use at the moment of implementation of the present invention;

at least one first supervision and control unit 4 for the charging facilities 5 of at least one operator of charging facilities for electric vehicles 2; such unit 4 can be considered as a virtual component, meaning by such definition that it may be a real entity or it may be defined solely as the platform through which the operator of charging facilities operates on its network of facilities and the corresponding operation methodology;

at least one computer 6 associated with a user account chosen from a user, a driver, a corresponding electric vehicle 2, the person jointly liable for the vehicle 2 and any combination thereof, considering that such computer 6 could be any device that is adapted to interface with the vehicle 2 and is capable of accessing the aforementioned telecommunications network. The computer 6 could therefore be any smart device (therefore a smartphone, a tablet, a smartwatch), a personal computer and/or a similar apparatus, or even the computer on board the vehicle 2 itself, which will need to be provided with the data and with the credentials of the user account (usually provided in the automotive/infotainment technology of the vehicle 2).

It should be noted that the user account (as defined in the present discussion) should be understood as the set of information that makes it possible to uniquely identify at least one of the following elements:

identification details of the driver/user, who uses the computer 6 in order to be able to use the system 1. Such data comprise the name, surname, address, date of birth, tax identification code and any other information that may be necessary;

identification details of the vehicle 2 with which the computer 6 is associated, for the correct use of the system 1. The details of the vehicle 2 can by way of example comprise the license plate, the chassis number, the recharging credentials, the type of recharging, and the identification details of the person jointly liable;

the credentials for connecting to the control electronics of the vehicle 2, for the acquisition of information relating to, for example, the residual charge of the storage batteries, the energy consumption, the route programmed on the respective satellite navigation system and the like;

the financial details of the person (physical or legal) to be billed for the cost of the recharge;

the data of the electric power supply contract to which to charge the costs for recharging the vehicle 2, including a code composed of letters and numerals (POD code) which identifies with certainty the physical point in the national territory where the energy is delivered by the supplier and received by the end customer with specific identification of the latter as well.

The server 3 will advantageously be adapted to be connected, via the telecommunications network, to the at least one first supervision and control unit 4 of at least one operator of electric charging facilities 5 for road vehicles 2 and to the at least one computer 6 associated with the corresponding user account.

Such connections, made via the telecommunications network, will enable the execution of operations comprising bookings, and/or corresponding cancellations, of at least one specific stall of at least one charging facility 5 and will allow sharing of the effects of such operations with a predefined number of computers 6 which are associated with at least one respective user account.

With particular reference to an embodiment of undoubted practical and applicative interest, the system 1 according to the invention can positively comprise at least one second supervision and control unit 7 which will be functionally associated with at least one supplier of electric power 8 and interfaced with the at least one main server 3 via the telecommunications network.

The suppliers of electric power 8 are, effectively, suppliers of the operators of charging facilities 5, but they are also suppliers of the users of the vehicles 2, who, almost certainly, will have an associated electricity user account, civil, commercial or industrial, with a respective supplier 8.

Each supplier of electric power 8 which is functionally associated with a respective second supervision unit 7 will therefore be able to positively comprise means for transceiving, to the main server 3, strings of data relating to the availability of electric power and associated tariffs in specific regions.

The availability of electric power in a given region is influenced by a plurality of factors, such as seasonality (in fact energy originating from renewable sources is produced mostly at certain periods of the year), the variation of consumption by local user accounts, or the compartmenting of the various areas of the electrical grid for reasons of management.

This determines a possible reduction of the costs of allocating energy in predefined regions and at certain periods, therefore making it more or less advantageous for the operators of the charging facilities 5 to purchase energy and, optionally, mount promotional campaigns with specific discounts that can be communicated to end users via the computer 6 by way of the emission of visual indicators (messages that appear on a display), acoustic indicators (sound messages) and the like.

The server 3 will therefore transfer the strings of data received from the second units 7 to the operators of the charging facilities 5 that are present in such specific regions, who will be able to modify their normal levels of energy allocation as a function of such data.

As previously explained above, the at least one computer 6 associated with a respective user account is of a type preferably selected from a device of the type of a smartphone, a tablet, a personal computer, a handheld computer, a smartwatch, an onboard computer of the vehicle 2, and the like.

What is essential is that the device 6 is capable of executing the instructions of a specific software application (which could also advantageously be designed for satellite navigation or be functionally associated with a specific navigation application and/or with an additional navigation device that implements it) governed by the technical data relating to consumption and the status of the battery of the vehicle 2 and by the settings programmed by the user/driver, or by a specific satellite road navigation system of the vehicle and with the first supervision and control unit 4 associated, also, with the main server 3 via the telecommunications network.

The computer 6 (i.e. the smart device that will execute the instructions of the software application cited previously) will carry out an analysis of the condition of residual charge of the batteries of the vehicle 2 (from which it will calculate an estimate of the travel range, understood as the maximum distance that can be traveled) and a schedule of the routes and of the necessary stops at charging facilities 5 (stops necessary to compensate for the reduced maximum capacity of the electric vehicles 2).

With particular reference to an embodiment of undoubted practical and applicative interest, the at least one computer 6 can positively comprise apparatuses for transceiving data to the first supervision and control unit 4 by way of which to perform the booking of charging facilities 5, as a function of a specific programmed route on specific dates and at specific times.

In particular it will be possible to plan a trip, indicating the starting point and the arrival point and specifying the date of the trip and the expected departure time (or the time at which the driver wants to arrive at destination).

In this manner the computer 6 by way of a navigation program (installed on the computer 6 itself or on an additional device connected to it) can calculate the best route, factoring in, along such route, the necessary stops for recharging the batteries and the duration of the recharge operations, in the first case providing the time of arrival and in the second case the time of departure. The stops will be scheduled at specific charging facilities 5 which the system considers the most suitable taking into account the discriminating factors set by the user/driver on the computer 6; if required the computer 6 can also proceed automatically to book the charging facilities for the time band envisaged by the navigation program.

Once the trip has been planned, therefore, the user of the vehicle 2 will have an ideal route, along which will be the scheduled stops and stopovers necessary to perform the recharging operations to enable the vehicle 2 to complete the desired route, confirming the booking that will commit such charging facilities 5 at the envisaged date and time for the stop, thus ensuring an uneventful and successful trip.

In fact the booking renders the designated charging facility 5 (or a specific charging post thereof) unavailable to other users for the time interval that corresponds to the booking: in this manner the vehicle 2 identified in the booking can arrive at the charging post and immediately plug in to carry out the charging operations without having to wait for it to become free because it cannot be used by any other user/driver except the one that made the booking, for the entire duration of the booking.

More specifically, it should be noted that the computer 6, by way of the software application installed on it, can advantageously also make changes in real time to the bookings of charging facilities 5.

Such changes can consist of canceling active bookings and of making new bookings: this is particularly useful because it makes it possible to change the planned route due to unforeseen circumstances and/or requirements.

For example, as a function of the value of the residual charge of the batteries and of the road mobility/traffic conditions along the route programmed on the satellite navigation system, it will be possible to estimate the impossibility of reaching a charging facility 5 that was booked initially (or the impossibility of reaching it at the time for which the booking has been made), thus making it preferable to cancel the existing booking and make a new booking. Estimating the reachability of the facility that was booked initially and observing the booking times will be possible by virtue of the fact that the software application reads instant by instant the residual charge of the batteries, the geolocation of the vehicle 2 and the road mobility/traffic conditions, interpolating such data and executing very reliable calculations for the trip that is being made with the electric vehicle 2.

It should furthermore be noted that the main server 3 can conveniently comprise at least one generator of strings of data for sending, to the first supervision and control unit 4 for the charging facilities 5, real-time information relating to the booking and corresponding cancellation of specific charging facilities 5 and for sending, to the computers 6 associated with user accounts related to specific electric vehicles 2 in transit proximate to the charging facility 5 for which a cancellation of booking has been sent, an alert that the facility 5 has unexpectedly become available.

This makes it possible to optimize the use of the network constituted by all the charging facilities 5: in fact the vehicle 2 linked to the user account for which a booking exists for which a cancellation is sent, can conveniently proceed to make a new booking of a facility that is a better match for the new requirements; at the same time all the other vehicles 2 that are proximate to the charging facility 5 for which the booking has been canceled (or which will arrive proximate to it at the time it was previously booked for and which is now available) will receive an alert of their availability on the computer 6 with which their user account is synchronized. In this manner the use will be encouraged of the charging facilities 5 in the intervals of time which previously corresponded to bookings that were subsequently canceled.

Each user who cannot reach the charging facility 5 by the booked time will be encouraged by the software application to send the cancellation of the bookings, by way of the emission of visual indicators (messages that appear on a display), acoustic indicators (sound messages) and the like.

If the user does not cancel a booking, it will be possible for fines to be imposed on that user, because his or her conduct did not allow an optimal use of the network of charging facilities 5 and deprived other users/drivers transiting through the region of the opportunity to recharge their batteries.

The penalty imposed on the user/driver who does not cancel the booking or who arrives late (recharging only a part of what was envisaged with the booking) will be equal to the tariff charged by the operator of the facility 5, net of the current not delivered. In this way the operator of the facility 5 is ensured the easement of lost earnings, which is constituted by service obligations and not by energy not delivered.

The present invention also extends its protection to include a software application for governing the operations for charging an electric vehicle 2, which is adapted to be executed on at least one computer 6 for a user account (which can comprise data and identification information corresponding to the driver/user, to the vehicle 2, and other parameters of interest, as specified previously), in conformance with what is illustrated above in relation to the system 1 according to the invention.

The software application will advantageously comprise instructions that are adapted to:
uniquely identify at least one user account chosen from a user, a driver, a corresponding electric vehicle 2, the person jointly liable for the vehicle 2 and any combination thereof, with which the computer 6 that executes the software application is associated;
monitor, in real time, too, the residual charge of the storage batteries of the electric vehicle 2;
monitor the road mobility/traffic conditions along the programmed route on a satellite navigation system of the vehicle 2, such satellite navigation system being paired, directly or indirectly, with the computer 6;
book respective charging facilities 5 at dates and times calculated by the satellite navigation system of the vehicle 2 identified in the user account paired with the computer 6, upon the planning of a specific trip;
cancel any bookings of charging facilities 5 upon detection of conditions of lower residual charge of the storage batteries of the vehicle 2 than that predicted by the satellite navigation system during programming of the route or in the event it is impossible to reach the facility 5 by the booked time owing to heavy traffic.

In a particularly advantageous version thereof on the practical level and on the implementation level, the software application according to the invention can furthermore advantageously comprise instructions that are adapted to:
receive information in real time from the main server 3, relating to the fact that at least one charging facility 5 has become available, following a cancellation sent by at least one software application associated with another user account which is associated with a respective other vehicle 2;
display in real time, on a screen associated with the computer 6 on which the software application is running, an alert that at least one charging facility 5 has become available;
book in real time at least one charging facility 5 that has since become available.

Obviously the software application according to the invention, if conveniently indexed and customized by the user, also makes it possible to book in real time at least one charging facility 5 that is offering reduced tariffs.

Through the software application according to the invention, the operations of booking and canceling a booking will be simple and immediate and can be carried out during the trip, including taking account of the arisen availability of charging facilities 5 which were initially booked by others (made available following the cancellation of the initial booking).

The scope of protection of the present invention further extends to a method for the operation and coordination of the system 1 described previously, which is constituted of a series of consecutive operations.

Firstly, it is necessary to associate the main server 3 with the computer 6 which in turn refers to a user account chosen from a user, a driver, a corresponding electric vehicle 2, the person jointly liable for the vehicle 2 and any combination thereof, via the installation of the specific software application on the computer 6.

Subsequently the main server 3 will be associated with the at least one first supervision and control unit 4 for the charging facilities 5 of at least one operator of charging facilities 5 for electric vehicles 2.

In particular, the method according to the invention (like the system 1 according to the invention) will be perfectly efficient if the number of participating operators of charging facilities 5 is high (but in any case comprises at least 2 operators).

Therefore each charging facility 5 controlled by the first supervision unit 4 must be connected bidirectionally with each computer 6 of a respective user account via the main server 3, in order to enable operations for the booking and cancellation of bookings of charging facilities 5.

In a more advantageous embodiment of the invention for all parties involved (operators of charging facilities 5, drivers of electric vehicles 2 and suppliers of electric power 8), the method according to the invention further entails associating the main server 3 with the at least one second supervision and control unit 7 which is functionally associated with the at least one supplier of electric power 8 (in this case too it is preferable that the highest possible number of the suppliers of electric power participate in the system 1).

The method then continues by detecting strings of data relating to the availability and tariffs of electric power in specific regions according to indications of the at least one supplier of electric power 8.

Such strings of data will then be transmitted to the operators of the charging facilities 5 that are present in the specific regions for the possible scheduling thereby of the purchase of electric power from at least one supplier 8, with which they have signed an electric power supply contract.

The advantage for the supplier 8 will be that they can sell available energy, maximizing the efficiency and profitability of their power plants.

The advantage for the operator of charging facilities 5 will be that they can buy electric power at advantageous prices: in possession of surplus energy, the supplier 8 in fact has every interest in reducing the price of the energy in order to sell it to an end user, as a corresponding accumulation would always make no economic sense.

A further aspect of the method according to the invention derives from the possibility to associate at least one user account, identified by a respective computer 6, with a respective electric power supply contract with an own supplier of electric power 8.

Each driver of electric vehicles 2 (and, more generally, each corresponding user) has usually stipulated an electric power supply contract with a specific supplier 8 (a civil, commercial or industrial supply contract).

By identifying such driver (user) as the contractor of the electric power supply contract via an identification code thereof, it will be possible to bill the costs of recharging the at least one vehicle 2, for which the association with such supply contract has been made, directly in the periodic electricity bill issued by the specific supplier 8, via an intermediate bilateral agreement between the operator of charging facilities 5 and the supplier 8.

It is clear that the details of the vehicle 2 and the details of the respective driver (including the corresponding financial details for billing and the identification codes of the electric power supply contract stipulated thereby with an own supplier 8) can advantageously already be identified in full in the various credentials of the user account, thus enabling the computer 6 to exchange all the necessary information for the correct billing of the recharging costs in the electricity bill, or in a specific invoice or the like.

Purely for the purposes of non-limiting example, in Italy there are around 500 different suppliers of electric power 8, with which civil, commercial and industrial electricity user accounts (electricity meters) are usually activated. Such suppliers 8 are, in turn, suppliers of the various operators of charging facilities 5 that are present in the region.

The system 1 and the method according to the invention enable access to the main server 3 also for the second units 7 which are connected to the suppliers 8 so as to enable the bidirectional exchange of information: from suppliers 8 to operators of facilities 5 and from operators of facilities 5 to suppliers 8 (more generally, a bidirectional exchange of information between the first unit 4 and the second unit 7).

By way of example, it should be noted that in periods where the supplier 8 will have excess electric power available for sale (think of regions or periods of the year in which the production of electric current from renewable sources is very prominent, such as, for example, in summer for photovoltaic plants and hydroelectric plants), the supplier will be able to promote it with operators of charging facilities 5 that are its clients, by sending alerts of the availability of this power in real time to the main server 3. It will be the operator of charging facilities 5 who will receive such information, and that operator will communicate to the main server 3 how much of this promotion it wishes to pass on to the market and how much it wishes to keep for itself, adapting its tariffs as a consequence (it should be noted that the software installed on the computer 6 will allow the user account to select the navigation mode that prefers the cheapest route, which does not necessarily correspond to the shortest one; the system 1 in this way prefers stops at the facilities 5 that offer the lowest tariffs and which are located on the route deemed the most economic).

This practice, in addition to making it possible for the end user to save money and to maximize the profits of the operators of charging facilities 5 and of the suppliers 8, also contributes to triggering a process of balancing the electricity consumptions, which will be more important the greater the number of suppliers and operators that participate in the system 1, in tandem with the growth of electric mobility (triggering a virtuous circle).

With regard to the method of payment permitted over the system 1 and the method according to the invention, it is necessary to highlight that each time a booking of a charging facility 5 is made, the software application will generate a unique code to be entered (there are other technologies that could avoid having to enter a code, all of which are within the scope of the inventive concept described herein: NFC technology, for example, would make it possible to validate the recharging session simply by holding the computer 6 up to the charging post) on the charging post of the charging facility 5 that has been booked, in order to validate the recharging session.

Such unique code will depend on a series of other factors, which also include the POD code associated with the driver/user or with the vehicle 2. The POD (Point Of Delivery of the electricity) code is a code composed of letters and numerals which identifies with certainty the physical point in the national territory where the energy is delivered by the supplier and received by the end customer, and therefore it also identifies the customer. Because it identifies a physical point on the distribution network and therefore a specific user account, the code does not change even if the supplier changes.

The algorithm that generates the unique code to be entered on the charging post of the booked charging facility 5 therefore takes into consideration the POD number (associated with the user account and therefore inserted in the software application running on the computer 6) of the supplier 8 with which the user/driver (the driver or user of the vehicle 2) stipulated the electricity supply contract.

The operator of the charging facility 5, at the end of each recharging session, will send the main server 3 the effective consumption data (effective, because if the user/driver arrives late and recharge only a part of the booked recharging session then the consumption data will not correspond to the data expected in the booking) of the recharging session carried out by the user/driver.

Such data will be sent to a database (DB) which will be accessed by the various participating suppliers 8 (through the respective second units 7). The information sent to the DB will comprise, in addition to the details of the user/driver, also the identification of the operator of the charging facility 5, the commercial tariffs applied by that operator, the energy drawn by the user/driver, the energy supplier 8 that supplies the operator of the charging facility 5, and the energy supplier 8 that supplies the user/driver.

To simplify the relations between the suppliers 8, the operators of the charging facilities 5 and the users/drivers (end users) it may be necessary to use the "single buyer" model, in order to "certify" the exchanges and the information relating to the various parties involved.

In such case, the database could also be interfaced or even coincide with the country's Integrated Information System (in Italy the SII, http://www.acquirenteunico.it/attivita/sistema-informativo), from which the suppliers 8 participating in the system 1 and/or in the SII will be able to draw the necessary information.

Once the information necessary for billing has been obtained, two cases are possible.

The simpler case is when the supplier 8 of the operator of the facility 5 is the same as that of the end user/driver: in this case, the supplier 8 will bill the amount for the recharging session directly in the bill for the user/driver, and will credit the operator of the facility 5 with an equivalent amount. Alternatively, the supplier can credit the operator of the facility 5 with the difference between the cost of the raw material used by it for the recharging session (without charging it in the bill) and the amount billed to the user/driver.

If the two suppliers 8 are not the same, then using the information collected from the database the various suppliers 8 involved can bill their clients also for charging sessions that those clients carried out at the facilities 5 of operators that are clients of other suppliers 8.

In this way, "lots" would be debited and credited between the various participating suppliers 8; such "lots" could be negotiated as compensation, making it possible to settle balances between the various suppliers 8 solely.

The system for settling payments between suppliers 8 and the respective clients that are operators of facilities 5 remains unaltered and is resolved as explained above if the supplier 8 of the operator of the facility 5 and of the user/driver coincide.

This compensation system, if it can be implemented, could allow the direct debiting of charging sessions carried out, to the bills of the users/drivers, while at the same time limiting the transactions involved in the overall process.

In order to confer a form of "certification" on all the transactions in play, and to facilitate the correct identification of the end users/drivers and corresponding POD codes, the "single buyer" model could be key. In practice the system 1 according to the invention is a platform, the purpose of which will be to dialog with the end users (drivers of vehicles 2) who will use the application on their computer 6. The system 1 will dialog with the first units 4 of the operators of charging facilities 5 which participate in the system 1, so as to manage in real time the status of all the charging posts belonging to those operators. The information thus exchanged will be needed to keep updated in real time the hourly scheduling of use of the charging posts owned by the participating operators of charging facilities 5, while also ensuring the constant updating of the user/driver interface, which is displayed by the application being run on the at least one computer 6 associated with a respective user account. At a later stage, when electric vehicles will be very widespread, there may be more than one system 1 according to the invention in a mutual network, associating them for example with the geographic areas to which the charging posts belong.

In practice each region, province, department and the like can be referred to a local system 1, and bringing them together in a network will give national coverage; the possibility is not ruled out however that a single system may be referred only to a single operator of charging facilities 5 (although the greater advantage of the system 1 according to the invention is the creation of a recharging network in which all the charging facilities 5 of a plurality of separate operators are present). A series of systems 1 may be preferable, in that a network structure could enable the reduction of inconveniences owing to anomalies that may arise in one or more of the predefined systems 1. In any case, all the systems 1 present can therefore also dialog between each other, thus providing, in addition to all the information adapted to facilitate mobility, predictive information of the aggregate consumption of electric power at national, regional, and area level and the like, thus making it possible to schedule electricity production (see the discussion of electricity balancing).

The software application according to the invention will enable end users (drivers of vehicles 2) to plan routes, keep the autonomy of the vehicle 2 under control, and at the same time book and manage recharging operations, along the route that they are traveling, even making changes in real time, in so doing reducing the stress generated by the idea of being stranded without capacity along the route that they are traveling.

Subordinately, the possibility is not ruled out of integrating the software application according to the invention in existing navigation programs, by stipulating agreements with the existing suppliers of navigation services, such as e.g. Google Maps, Waze etc.

As previously explained above, it is relevant to highlight that the software application according to the invention can be installed on any computer 6, therefore on any mobile device (smartphone, tablet, handheld computer, smartwatch and the like) and also onboard the vehicles 2 produced by the various car manufacturers.

The software application will need to store some personal information details about the driver/user (such as for example name, surname, address, credit card details, POD number issued by the supplier of electric power 8 chosen by the driver/user 9 and the like) and details of the vehicle 2 (such as for example the license plate of the vehicle, consumption data of the vehicle, types of recharging the vehicle can accept, battery capacity and the like).

Once up and running, the software application will synchronize with the associated vehicle 2 (identified in the respective user account), uploading some essential information for determining the residual charge, such as the level of charge remaining in the storage batteries, the consumption data of the vehicle 2, the unique identification number of the vehicle 2 and the like.

The driver/user can enter the route to be traveled (specifying, in particular, the departure address, the arrival address and the expected time of departure or the desired time of arrival) and the software application (associated with a satellite navigation system, which is also executed on the computer 6 or on an additional device connected to it) will automatically provide a series of information items including for example necessary stops for recharging operations, the number and type of the charging post to use and the corresponding time band, the duration of the recharging session necessary and much other information which will depend on the activation of some functions that are present in the software application.

Such information can be obtained using the basic data that the software application will detect from the vehicle 2, such as for example the residual charge, the average consumption, types of recharging the vehicle can accept, and the like.

The possibility is not ruled out that software application could draw the necessary information from a suitable data bank stored in it.

The data will be processed by the software application, combining them with other information that can be drawn from the satellite navigation system (such as for example the current position of the vehicle 2, the exact distance from the point of arrival, the traffic along the route, the preferred routes of the driver/user, the weather conditions and the like).

In particular the possibility is not ruled out that in the software application some preferences can be set directly by the driver/user: by way of example the driver/user may indicate that they prefer operators of charging facilities 5 that offer the lowest prices, or operators where they can use a specific discount, operators belonging to a certain brand, operators that are clients of the same supplier of electric power 8 as theirs, or they may indicate a preference for planning the route that ensures the desired waiting times (generally the shortest possible).

Once the software application has correctly calculated the route, selecting the charging facilities 5 to be used, it will allow the driver/user to book recharging sessions at those facilities (in the time band calculated by the software application).

The successful booking will generate a unique code that the driver/user will have to enter (via a keypad or by transmitting in some way) into the charging post indicated (or into the charging posts of the chosen facility 5, if multiple recharging sessions are necessary) in order to proceed with the recharging operation.

Such code, generated by the software application using the information loaded previously, will ensure that at that charging post and at that time band only he or she can recharge, ensuring that the charging post will be free upon his or her arrival.

If the driver/user does not arrive at the charging post by the specified time band, he or she will lose the booking and will be charged a penalty, in conformance with what is discussed above.

By contrast, if the motorist notifies the system 1 of the impossibility of their arriving at the charging post in the booked time band (a communication that may occur automatically thanks to the interface with the satellite navigation system), the software application will be able to proceed to automatically generate a new booking that is as close as possible to meeting the needs of the driver/user, freeing up the charging post from the old booking and making it visible to other drivers/users who in that time band may find themselves along the same route and who have activated a specific function in their software application.

The system 1 also allows the possibility of gamification of some operative stages of the method applied by the system 1, such as for example the provision of a "points" system, which penalizes users who do not keep their bookings or who are found to occupy the recharging slots after the scheduled time; by contrast it will need to reward users who turn up for their bookings or who cancel them with adequate notice.

In order to identify the drivers/users who occupy the recharging slots after the booked time, the charging facilities 5 will need to be provided with video cameras (in particular when they operate without support staff at night).

In the event of low autonomy or failure to book, the software application can indicate the nearest available charging post 5 to the driver/user; in these cases it is possible that the tariffs applied may be the highest, as they may include an urgency supplement.

It will also be possible with the software application to set the selection of the charging facilities 5 according to the brand they belong to, or to prefer stops at the points owned by the operator with which a supply contract is already in force.

The software application must be capable of providing the driver/user with the history of the recharging operations performed in a determined period, such information must contain, in addition to standard details (date, place, name of the provider/operator, name of the supplier of electric power 8 used etc.), the tariff paid.

This will be necessary in order to verify the correct debits, both to credit cards and to the bills/invoices of the supplier of electric power 8 with which the electricity supply contract (residential or corporate) has been signed.

There will be several ways to pay for recharging sessions: by charging to a credit card, or by a cumulative charge to an invoice/bill. Even if the operator of the facility 5 and the supplier 8 are not the same, it will still be possible, by virtue of the information present in the system 1 (according to the methods described previously), to automatically charge to the invoice/bill of the driver/user, compensating the amounts between the various parties involved.

One of the advantages of the system 1 according to the invention lies in the possibility to be able to dialog with a plurality of separate operators of charging facilities 5.

Another advantage lies in the possibility to make bookings even fairly far into the future, allowing the planning of trips well before the trip itself takes place.

Such a possibility is particularly advantageous for those responsible for managing company fleets of vehicles 2 (consider road haulage, couriers, taxis and, in general, all types of services provided by using vehicles 2) which can therefore carry out periodic planning of the commercial itineraries of all their vehicles 2.

Furthermore, the possibility to cancel a booking and to formulate a new booking in real time enables drivers/users to optimize their route as a function of requirements that may emerge over the course of that route.

Furthermore, in the event of cancellation of a booking by a driver/user, the system 1, the method and the software application according to the invention will comprise a function that notifies other drivers/users who are proximate to the section of road affected (or who will be there at the time when the booking was canceled) that the charging facility 5 has a free charging post, offering the possibility to book it immediately and recharge at it without waiting.

The system 1 therefore guarantees that the driver/user will have the specific charging post of the charging facility 5 reserved for that driver/user by virtue of the booking, rendering it unusable by other users/drivers during the period of that booking.

The booking made with the software application according to the invention furthermore makes it possible to plan the duration of the recharging operation in advance, making it possible to predict the time when the charging post will become free again after the recharging operations. This increases the efficiency and therefore the yield of the charging facility 5.

A high number of scheduled bookings enables the operator of the charging facility 5 to learn the daily energy demand and to schedule the purchases of energy from its supplier 8 as a function of the consumption that can be ascribed to those bookings (with consequent possible activities that include profiling of energy consumption).

The failure in managing the charging posts of a charging facility 5 would prevent the respective operator from predicting energy consumption, therefore denying him or her the possibility to enjoy better conditions of purchase, which can be enjoyed by notifying his or her supplier of electric power 8 in advance of the consumption FIGURES.

The system 1, by processing the data exchanged with the vehicle 2 and stored previously using the respective software application, is capable of predicting when, where and for how long the vehicle 2 will need to stop in order to carry out recharging of its storage batteries.

By virtue of the software application, in real time an operator of charging facilities can publicize its discounts (directly on the screen of the computer 6) and, if an "economic recharging" option has been selected in the software application, all the operators of charging facilities 5 will be highlighted which are offering promotions at that moment, automatically programming a route that prefers their use.

The promotions can be programmed by the operator of charging facilities 5 automatically, on the basis of the tariffs offered at certain times by its supplier of electric current 8 and on the basis of the bookings that the system 1 will have collected and provided to him or her, therefore allowing, considerably in advance, optimization of the use of his or her charging posts for recharging.

It is furthermore possible to extract aggregate data on consumption of electric current from the system 1 considerably in advance: this possibility is important in that it can enable the adjustment and balancing of the entire electrical grid.

It should be noted that, according to the invention, the cancellation of a booking can be done automatically by the software application or via a confirmation request from the driver/user. Similarly, the new booking can also be made automatically or with the confirmation of the driver/user (in conformance with the preferences set by the driver/user in the software application). In this manner it will also be possible to specify that the new booking offers the minimum waiting time, or the minimum cost of recharging, or the possibility of using additional services, and the like.

The fact that the system 1, the software application and the method according to the invention provide for penalties for incorrect use of the bookings (for example failure to cancel) or for abusive occupation of a charging post of a charging facility 5 for too long, will encourage the virtuous behavior of the driver/user.

The system 1, the software application and the method according to the invention allow for the bookings to be repeating, for example weekly, daily and monthly, a useful function for those who travel the same routes frequently.

The system 1, the software application and the method according to the invention make it possible for all operators of charging facilities 5 present in the territory of the various countries to use a network to access a platform, which via the software application can manage the status of the charging facilities in real time. This makes it possible to avoid needless congestion at the charging facilities 5 equipped with charging posts for electric recharging and therefore facilitate the mobility of the electric vehicles 2. Furthermore, the driver/user is guaranteed an uneventful voyage, without having to worry about running out of battery charge.

It will enable the operators of charging facilities 5 to know consumption of electricity in advance, therefore making possible a platform for purchasing electric power and availing of the best conditions offered by the market.

It will enable the operators of charging facilities 5 to promote incentives and promotions in real time to a large number of drivers/users, who would otherwise be impossible to reach.

It will enable the operators of charging facilities 5 to reduce the inactive times of their charging posts, thus optimizing the yields of those facilities 5.

It will provide the various suppliers of electric power 8 in advance with the expected consumption of electricity deriving from recharging operations of the electric vehicles 2 that are present in the territory. The information could be useful for reducing problems of unbalancing of the electrical grids which, with the advent of electric mobility, will become significant.

Advantageously the present invention solves the above mentioned problems, by providing a system 1 for control and management of the charging of electric vehicles 2 that enables an effective planning of the necessary recharging operations during a trip.

Conveniently the system 1 according to the invention can operate on a plurality of separate operators of charging facilities 5 (providers).

Conveniently the system 1 according to the invention makes it possible to program the planning of the operations to recharge a vehicle 2 in real time, as a function of the routes to be covered and of the corresponding consumption.

Positively the system 1 for control and management of the charging of electric vehicles 2 according to the invention is easily and practically implemented and of low cost: such characteristics render the system 1 according to the invention an innovation that is safe in use, especially in light of the growing expansion of electric mobility.

The invention, thus conceived, is susceptible of numerous modifications and variations, all of which are within the scope of the appended claims. Moreover, all the details may be substituted by other, technically equivalent elements.

In the embodiments illustrated, individual characteristics shown in relation to specific examples may in reality be interchanged with other, different characteristics, existing in other embodiments.

In practice, the materials employed, as well as the dimensions, may be any according to requirements and to the state of the art.

The disclosures in Italian Patent Application No. 102018000011089 from which this application claims priority are incorporated herein by reference.

The invention claimed is:

1. A system for control and management of the charging of electric vehicles of a type chosen from vehicles with exclusively electric motor drives and vehicles with hybrid motor drives, comprising:
   at least one main server,
   at least one telecommunications network,
   at least one first supervision and control unit for charging facilities of at least one operator of charging facilities for electric vehicles,
   at least one computer associated with a user account chosen from a user, a driver, a corresponding electric vehicle, the person jointly liable for the vehicle and any combination thereof,
   said server being adapted to be connected, via said telecommunications network, to said at least one first supervision and control unit of at least one operator of electric charging facilities for road vehicles and to said at least one computer associated with said user account, for the execution of operations comprising bookings, and/or corresponding cancellations, of at least one stall of at least one charging facility and for sharing the effects of such operations with a predefined number of computers which are associated with respective user accounts, wherein said at least one computer associated with said user account is of a type preferably chosen from a device of the type of a smartphone, a tablet, a personal computer, a handheld computer, a smartwatch, an onboard processor of the vehicle, said device implementing a software application that is adapted to interface with:
   batteries of the vehicle, for an analysis of their charging status and of any specific charging modes,
   a satellite road navigation system of the vehicle or installed on the computer or an additional device connected to the computer, for planning routes and the necessary stops at charging facilities,
   said main server and via said main server to said first supervision and control unit via said telecommunications network, wherein said at least one computer comprises apparatuses for transceiving data to said first supervision and control unit for the boking of charging facilities, as a function of a specific programmed route on specific dates and at specific times, wherein said at least one computer, by way of said software application, comprises processes for the real-time modification of said bookings of charging facilities, which consist of canceling bookings that are already active and of making new bookings, as a function of the value of residual charge of said batteries and of the road mobility/traffic conditions along a programmed route on the satellite navigation system, which are detected by said software application, said at least one computer or said additional device connected to the computer being configured to plan a trip in advance, indicating a starting point and an arrival point and specifying a date of the trip and an expected departure time or a time at which the drive wants to arrive at destination, said at least one computer by way of a navigation program installed on said computer or on said additional device connected to the computer calculating a best route, factoring in, along the route, necessary stops for recharging the batteries and a duration of recharge operations, providing either the time of arrival or the time of departure, said computer proceeding automatically to book the charging facilities for the duration envisaged by the navigation program, said booking rendering a designated charging facility unavailable to other users for a time interval that corresponds to the booking.

2. The system according to claim 1, wherein at least one second supervision and control unit is functionally associated with at least one supplier of electric power and is interfaced with said at least one main server via said telecommunications network.

3. The system according to claim 2, wherein each supplier of electric power functionally associated with said second supervision unit comprises means for transceiving, to said main server, strings of data relating to the availability and tariffs of electric power in specific regions, said server transferring said strings of data to said operators of the charging facilities that are present in such specific regions.

4. The system according to claim 1, wherein said main server comprises at least one generator of strings of data for sending, to said first supervision and control unit for the charging facilities, real-time information relating to the booking and corresponding cancellation of specific charging facilities and for sending, to said computers associated with specific user accounts that identify vehicles in transit proximate to the charging facility for which a cancellation of booking has been sent, an alert that the facility is available.

5. A software application for controlling the operations for charging an electric vehicle, which is adapted to be executed by at least one computer associated with a user account chosen from a user, a driver, a corresponding electric vehicle, the person jointly liable for the vehicle and any combination thereof, said computer being comprised in the system according to claim 1, further comprising instructions that are adapted to:
uniquely identify said user account with which said computer is associated;
monitoring, including in real time, the residual charge of the storage batteries of said electric vehicle;
monitoring the road mobility/traffic conditions along the programmed route on a satellite navigation system of said vehicle, said satellite navigation system being paired, directly or indirectly, with said computer;
booking respective charging facilities at dates and times calculated by said satellite navigation system of said paired vehicle, upon the planning of a specific trip;
canceling any bookings of charging facilities upon detection of conditions chosen from a lower residual charge of the storage batteries of the vehicle than that predicted by said satellite navigation system during programming of the route and heavy traffic detected by the satellite navigation system, wherein said at least one computer, by way of said software application, comprises processes for the real-time modification of said bookings of charging facilities, which consist of canceling bookings that are already active and of making new bookings, as a function of the value of residual charge of said batteries and of the road mobility/traffic conditions along a programmed route on the satellite navigation system, which are detected by said software application, said at least one computer or an additional device connected to the computer being configured to plan a trip in advance, indicating a starting point and an arrival point and specifying a date of the trip and an expected departure time or a time at which the driver wants to arrive at destination, said at least one computer by way of a navigation program installed on said computer or on said additional device connected to the computer calculating a best route, factoring in, along the route, necessary stops for recharging the batteries and a duration of recharge operations, providing either the time of arrival or the time of departure, said computer proceeding automatically to book the charging facilities for the duration envisaged by the navigation program, said booking rendering a designated charging facility unavailable to other users for a time interval that corresponds to the booking.

6. The software application according to claim 5, characterized in that it comprises instructions that are adapted to:
receive information in real time from said main server, relating to the fact that at least one charging facility has become available, following a cancellation sent by at least one software application associated with another specific user account;
display in real time, on a screen associated with said computer on which said software application is running, an alert that at least one charging facility has become available;
booking in real time at least one charging facility that has since become available.

7. A method for the operation and coordination of a system according to claim 1, which consists of:
associating with said main server said computer, which is functionally associated with said user account, via the installation of said specific software application on said computer;
associating with said main server said at least one first supervision and control unit for the charging facilities of at least one operator of charging facilities for electric vehicles;
connecting bidirectionally each charging facility controlled by said first supervision unit with each computer associated with a respective user account via said main server, in order to enable operations for the booking and cancellation of bookings of charging facilities.

8. The method according to claim 7, which consists of:
associating with said main server said at least one second supervision and control unit which is functionally associated with said at least one supplier of electric power;
detecting strings of data relating to the availability and tariffs of electric power in specific regions according to indications of said at least one supplier of electric power;
transmitting said strings of data to said operators of the charging facilities that are present in said specific regions for the possible scheduling thereby of the purchase of electric power from at least one supplier.

9. The method according to claim 8, which consists of:

associating at least one user account of a respective computer with a respective electric power supply contract with a supplier of electric power;

billing the charging costs of said user account for which said association has been made directly in the periodic electricity bill issued by the specific supplier, via an intermediate bilateral agreement between said operator of charging facilities and said supplier.

\* \* \* \* \*